United States Patent
Snell

(10) Patent No.: US 6,792,713 B2
(45) Date of Patent: Sep. 21, 2004

(54) REPLENISHABLE PEST CONTROL APPARATUS

(75) Inventor: Eric J. Snell, Hatfield, PA (US)

(73) Assignee: B & G Equipment Company, Jackson, GA (US)

( * ) Notice: Subject to any disclaimer, the term of this patent is extended or adjusted under 35 U.S.C. 154(b) by 0 days.

(21) Appl. No.: 10/273,479

(22) Filed: Oct. 18, 2002

(65) Prior Publication Data

US 2003/0074832 A1 Apr. 24, 2003

Related U.S. Application Data

(60) Provisional application No. 60/343,787, filed on Oct. 19, 2001.

(51) Int. Cl.$^7$ ............................................ A01M 19/00
(52) U.S. Cl. ..................................................... 43/124
(58) Field of Search ......................... 43/124, 131, 132.1

(56) References Cited

U.S. PATENT DOCUMENTS

| | | | | |
|---|---|---|---|---|
| 1,964,611 A | * | 6/1934 | Watson | 43/131 |
| 1,994,859 A | * | 3/1935 | Conrad | 43/131 |
| 2,157,953 A | * | 5/1939 | De Long | 43/131 |
| 2,168,339 A | * | 8/1939 | Himel | 43/121 |
| 3,807,082 A | * | 4/1974 | Hautmann et al. | 43/125 |
| 4,581,845 A | * | 4/1986 | Burkholder et al. | 43/107 |
| 4,709,503 A | * | 12/1987 | McQueen | 43/114 |
| 4,823,506 A | * | 4/1989 | Demarest et al. | 43/131 |
| 4,866,877 A | * | 9/1989 | Barak | 43/121 |
| 4,908,977 A | * | 3/1990 | Foster | 43/107 |
| 4,945,673 A | * | 8/1990 | Lavelle | 43/124 |
| 4,970,822 A | * | 11/1990 | Sherman | 431/31 |
| 5,033,229 A | * | 7/1991 | Demarest et al. | 43/131 |
| 5,044,114 A | * | 9/1991 | Haberer | 43/132.1 |
| 5,090,153 A | * | 2/1992 | Mullen et al. | 43/114 |
| 5,329,726 A | * | 7/1994 | Thorne et al. | 43/124 |
| 5,489,066 A | * | 2/1996 | Oldham | 239/745 |
| 5,555,672 A | * | 9/1996 | Thorne et al. | 43/124 |
| 5,713,153 A | * | 2/1998 | Cook et al. | 43/114 |
| 5,778,596 A | * | 7/1998 | Henderson et al. | 43/132.1 |
| 5,870,853 A | * | 2/1999 | Williams | 43/131 |
| 5,979,108 A | * | 11/1999 | Adams | 43/121 |
| 5,983,558 A | * | 11/1999 | Las et al. | 43/131 |
| 6,088,949 A | * | 7/2000 | Nicosia et al. | 43/107 |
| 6,189,259 B1 | * | 2/2001 | Soller | 43/131 |
| 6,219,960 B1 | * | 4/2001 | Contadini et al. | 43/121 |
| 6,374,536 B1 | * | 4/2002 | Washburn | 43/132.1 |
| 6,378,243 B1 | | 4/2002 | Snell et al. | |
| 6,393,760 B1 | * | 5/2002 | Lingren | 43/122 |
| 6,516,558 B1 | * | 2/2003 | Lingren et al. | 43/107 |
| 6,532,695 B1 | * | 3/2003 | Alvarado | 43/122 |
| 6,651,378 B2 | * | 11/2003 | Baker | 43/131 |
| 2001/0025447 A1 | * | 10/2001 | Nimocks | 43/131 |

* cited by examiner

Primary Examiner—Charles T. Jordan
Assistant Examiner—Jordon Lofdahl
(74) Attorney, Agent, or Firm—Piper Rudnick LLP

(57) ABSTRACT

A replenishable pest control apparatus includes a housing having at least one component, such as a surface or shelf, treated with a residual pesticide and at least one other component treated with or configured to contain, an attractant. Each of the components is configured to be replenished by re-treating the component with an appropriate attractant and/or pesticide, by refilling a reservoir, by replacing a depleted component with a pretreated component, or a combination thereof. The attractant is not required to be toxic, and may comprise any appropriate/desired attractant, such as a food source, an odor attractant, a visual attractant, an acoustic attractant, a pheromone, or a combination thereof. The pesticide may be any appropriate/desired pesticide for the type of pest to be controlled.

7 Claims, 13 Drawing Sheets

REPLENISHABLE PEST CONTROL APPARATUS

CROSS-REFERENCE TO RELATED APPLICATION

The present application claims priority to U.S. Provisional Application Serial No. 60/343,787 filed Oct. 19, 2001, entitled "Insect Control Device With Attractant(s) and Residual Insecticide", the entirety of which is incorporated herein by reference.

FIELD OF THE INVENTION

The present invention is generally related to pest control and more specifically related to an apparatus for attracting and/or exterminating pests, such as flying and crawling insects.

BACKGROUND

Outdoor flying insect devices predominately incorporate means of trapping the pests or by requiring the pest to ingest a toxic food source. A disadvantage of using toxic food sources is that toxic food sources are not always readily available. Trapping means for outdoor traps typically utilize adhesive immobilizing methods. A disadvantage of using adhesive immobilizing methods for outdoor traps is that adhesive immobilizing methods can not withstand rain and sun stress. Other outdoor trapping means incorporate one way entry designs that greatly reduce catch rates by making it nearly as difficult for the pests to enter as it is for them to escape. Due to these limitations, outdoor control of flying insects around commercial buildings often rely on toxic baits, inefficient trapping methods, residual treatments to large areas, or simply do nothing outside and rely only on controlling pest after they enter a building.

Typically, a pest control technician must visit each trap to evaluate the status of the trap. Often, traps are replaced with new traps. Thus requiring the pest control technician to carry several traps or make several trips back to his/her truck to get more traps and drop off old traps. Other situations require the pest control technician to carry heavy, awkward containers of pesticides, which can be used to fill up containers in the traps.

An improved pest control apparatus is desired.

SUMMARY

A pest control apparatus includes an attractant and a pest control agent. At least one of the attractant or the pest control agent is replenishable.

DETAILED DESCRIPTION

Figure 1:
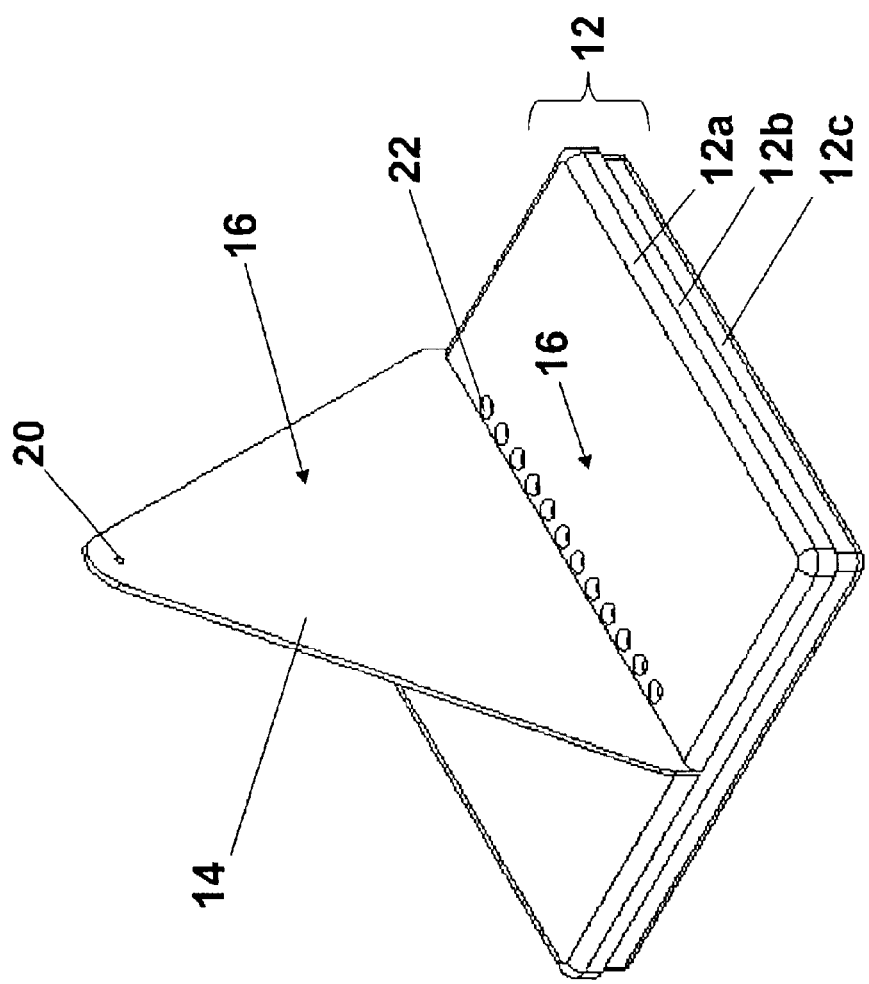
FIG. 1 an isometric view of an embodiment of a replenishable pest control apparatus in accordance with the present invention comprising an attractant portion and a pest control portion.

Various embodiments of a replenishable pest control device in accordance with the present invention are described herein. One exemplary embodiment includes a housing having at least one component, such as a surface or shelf, treated with a residual pesticide and at least one other component treated with or configured to contain, an attractant. Each of the components is configured to be replenished by re-treating the component with an appropriate attractant and/or pesticide, by re-filling a reservoir, by replacing a depleted component with a pretreated component, or a combination thereof. The attractant is not required to be toxic, and may comprise any appropriate/desired attractant, such as a food source, an odor attractant, a visual attractant, an acoustic attractant, a pheromone, or a combination thereof. The pesticide may be any appropriate/desired pesticide for the type of pest to be controlled.

A pest control apparatus in accordance with the present invention is configured to address behavioral preferences, tendencies, and physiological needs of multiple commonly encountered pests in order to control a broad variety of pest populations. Applicable types of pests include arthropods, crawling insects, flying insects, millipedes, centipedes, slugs, crickets, grasshoppers, termites, rodents, ants, cockroaches, crickets, ground beetles, earwigs, ladybugs, fleas, spiders, centipedes, millipedes, and slugs, for example.

Various embodiments of the replenishable pest control device are configured to be placed adjacent and/or secured to a variety of objects, depending upon the type of pest to be controlled. Objects include, without limitation, interior and exterior building surfaces and materials, poles, pipes, cables, trees and other vegetation, and targeted areas of soil. Also, the act of controlling a pest includes attracting, repelling, monitoring, trapping, killing of the pest or a combination thereof. Similarly, pest control means or pest control material, as used herein, may include any appropriate device or material for effectuating the desired pest control, such as snap traps for trapping and/or killing rodents, tacky-surfaced glue boards for trapping rodents, flying pest, or ground crawling pests, water and edible toxicants for any pest discussed herein, nutritive and/or insulative shelter material for termites, pheromones and related scent-based pest attractants, carbon dioxide for attracting termites and fleas, acoustic emissions, visual attractants, and light sources for attracting fleas, for example.

The following summary is provided as an aid in understanding the replenishable pest control apparatus in accordance with the present invention as described herein.

Pest Movement Attractants

Almost all pests have natural tendencies or senses that dictate how they move through their environment. Rarely in the design of known pest control systems, however, is more than casual attention devoted to pests' locomotive traits as behavioral characteristics to be capitalized upon in the design of the system in order to enhance system performance. Many general and specific pest movements for which pest attraction/control structure may be designed can be classified as follows:

Edge-Of-Wall Effect: This is perhaps the most common movement behavior of pests in general. Ants, rodents, crickets, cockroaches, millipedes, ground beetles and many other ground crawling pests travel along the bases of walls or similar wall/ground or wall/floor intersections. This behavior is manifested by many pests because of their apparent desire to place one antenna or whisker on the wall or upright surface while placing the other on the ground or similar traveling surface. It may be observed at the juncture, in any plane, of substantially orthogonally disposed surfaces such as wall/floor and wall/ceiling junctures and can be exploited by designing pest control equipment that fits as closely as possible to the face of a wall. In addition, natural voids or gaps are formed at the bases of exterior walls when soil dries, contracts, and separates from the structure's foundation. This phenomenon creates an excellent traveling juncture for many pests such as ants. When designing pest control equipment therefore, the equipment should be such that it remains close to the foundation and preferably projects into the void to intercept trailing and nesting pests.

Pest control system performance can be further enhanced by simulating the edge-of-wall effect at the outer peripheral regions of the station which would function as a structural attractant.

Corner Effect: This is an extension of the edge-of-wall effect because walls or similar surfaces typically eventually lead to a corner (outer or inner). Corners are more likely to have higher pest activity because they represent the juncture of three usually mutually orthogonal planes. Purposefully designing pest control equipment to fit closely into corners, therefore, would promote higher pest activity in and around the equipment.

Groove Effect: The groove found between two rows of bricks, slabs and the like creates a natural pathway for small crawling pests such as ants. Explanation of this behavior can be designed into pest control equipment by making grooves that are too small to be attractive for pests other than ants so that ants can be attracted, for example, to a different compartment in a pest control station than compartments designed for other pests. The groove effect can also be used to lure pests into the equipment and reduce the likelihood of pests trailing around the outside of the equipment and missing the toxicant or other pest control means contained in the equipment.

Outer Edge Effect: Ants are one of the few common pests that follow outer edges of structures, e.g., the outer edge on the top of a shelf or a vertical edge up the outer corner of a wall. This is another movement behavior that can be accommodated by incorporating outer edge type structure into pest control equipment to attract ants to desired areas in the equipment.

Ridge Effect: A raised ridge on a flat surface will direct many randomly foraging pests from one direction to another. This behavioral tendency can be used to direct pests such as ants from one area of a pest control device to another area where ant-specific baits may be located. This feature can help prevent certain pests from entering a pest control device and exiting the device without finding the toxicants or other pest control means contained therein. That is, without such ridges certain pests may enter and exit the device without encountering the pest control agents.

Cable Effect: Ants, cockroaches, and certain other ground crawling pests also tend to travel along the upper surfaces of cables, wires, water hoses, pipes and other elongate, rounded members. This is a common way for pests to enter a structure or quickly trail across a topographically complicated area such as a yard. This trait can be exploited by designing pest control equipment which can be mounted to elongate substantially cylindrical members that are already in place around a structure (e.g., cable TV wires, water hoses, water pipes, etc.). Similarly, disposing rods, wires, cables, or similar substantially cylindrical members to project from a pest control device in order to attract pests into the device would represent another way of capitalizing upon this particular behavioral pattern.

Harborage or Refuge Effect: When pests such as rodents and ground crawling pests, e.g., cockroaches, crickets, ground beetles, centipedes, etc. first enter into a new area (such as when carried indoors with stored products or when they crawl under an exterior door), they quickly seek shelter. The basic need to forage into new areas is driven by the search for food. However, when faced with new surroundings, most pests initially seek protection by following closely along edges of walls until finding a suitable hiding site. Once secure in the new harborage they will resume the search for food. Because of many pests' tendency to find protection rapidly, it is possible to design equipment that provides an attractive "false harborage", described in greater detail hereinafter, which can be placed at key locations where pests first enter a structure. For instance, rodents, crickets and ground beetles usually enter under doorways. Thus, equipment should be designed to intercept such pests just inside of doorways/garage doors. German cockroaches and other pests, however, may first enter a grocery or restaurant when carried in with infested boxes of supplies. These pests can be intercepted by designing equipment that can be properly positioned at the top of baseboards or at the bases of shelving legs.

Upward Movement Effect: Some pests such as cockroaches can readily crawl on vertical surfaces and have a natural tendency to crawl upwards in search of harborages or food. This habit can be targeted with equipment designs by incorporating features that allow placement onto vertical surfaces and, particularly, vertical corners. Such equipment may include a false harborage, a tacky-surfaced trap known as a glueboard or a poisonous bait.

Downward Wall Movement and Baseboard Tracking Effect: When German cockroaches and other pests are first introduced into a new environment (e.g., in an infested box carried into a storage room in a restaurant), they have two options of leaving the infested box and finding other food and harborage sources. The first is to climb onto the wall and the second is to climb down the legs of the storage shelving. If a box is touching a wall, cockroaches' first tendency is to move upward. If the storage area is cluttered so as to interfere with air flow and light transmission, the cockroaches may crawl to the ceiling line and move to the corner. However, in many cases, there is too much air movement and light whereby, when moving upward on the exposed wall, the cockroaches will go back down the wall toward less air and less light. Upon turning downward, the first straight edge a cockroach will normally encounter is the top of the baseboard. Their tendency is then to follow the top of the baseboard which will lead to either a corner of a room or a door frame. One of the most important pest control equipment design features for preventing introduced cockroaches and other pests from becoming established indoors is the capability for attachment to the top of a baseboard. Pest control equipment placed at the top of the baseboard should therefore serve multiple purposes including attracting pests with a false harborage, baiting the pests to kill them, and/or trapping some pests with glueboards as a monitor the extent of infestation of newly released pests.

Upward or Downward Equipment Tracking Effect: Many of the harborage locations for German cockroaches within a structure such as a residence, grocery or a commercial restaurant are associated with sinks, appliances, and shelving, as well as the frames and legs of such equipment. This provides the ability to predict the movement of cockroaches within such environments. The pests must leave these harborages in search of food using one or two routes: up or down a wall, as described above, or down the legs of the equipment. As noted, pest control devices may be designed for placement at the corners on top of baseboards which can intercept those pests moving down the wall. Still other pest control systems may surround the base of equipment a legging with glueboards, false harborages, baiting and/or treatment devices. The present invention therefore also contemplates pest control devices that may surround equipment legging to prevent upward movement of cockroaches and other pests.

Pest Physiology Attractants

According to the present invention, structural provision for pheromones, food, water and other attractants can also be incorporated into the design of pest control equipment to better enhance the effectiveness of traps and toxicants contained within the equipment. Air flow over such attractants is important since the 'smell' is transmitted by air movement. Equipment can be designed to maximize air flow over the attractant from all areas or in a particular direction (dependent on station position). Accordingly, structural provision for pheromonal and related scent-based attractants may be included into pest control equipment designs to entice specific pests to one or more specific area(s) within the equipment. If a unit incorporates more than one pest control feature (such as ant baiting area and a glueboard area), it may be desirable to attract a certain species of pest into all chambers or only one chamber and not others. For instance, if one wishes to monitor a pest population infesting stored products such as dry pet foods, an appropriate pest pheromone must be placed directly over or on a glueboard. Otherwise, few if any pheromonally—attracted pests may become stuck to the glueboard thereby suggesting that the infestation is light. That is, the pests will be attracted to the exact area where the pheromone is located and avoid being caught in the glueboard.

Ideal Harborage Factors

All pests have particular requirements for an ideal harborage site which can be incorporated into pest control system equipment design. Such aspects can be included into the designs of dedicated "false harborage" components or supplemental attractant features of other dedicated components. Indeed, appreciation of a combination of factors is critical to replicating a good harborage for a particular pest. Included among the factors that add to the attractiveness of a site as a harborage include adequate moisture, shelter from excess water and proper void size.

Adequate Moisture: Adequate moisture is one of the most important factors for providing a good harborage for ants and many other species of pests. It is imperative for most pests, however, that the moisture only manifest itself as high humidity and not as actual standing or pooling water. In warm environments, the combination of water and heat in a harborage creates a "sauna effect" ideal for many pests such as ants. Designing equipment with a small area for water to pool or collect and then evaporate with heat will increase the humidity and attractiveness of an equipment design. Equipment designed to be placed near a water source such as a downspout is another way to make equipment more attractive since pests frequently nest under or near downspouts.

Shelter From Excess Water: Protection from excess rain, sprinklers or downspouts is critical to an ideal harborage or station design because the nest might be washed away and destroyed. Most pests seem to sense the ability of a potential harborage to keep excess water out and are attracted to those which suitably shield the pest from excess water.

Proper Void Size: Suitably sized openings, voids, or cavities in a protected area are critical to attracting certain pest species. For example, thigmotrophic pests need to feel their backs touch the interior surface of a structural void in order to find the void attractive as a harborage. Other pests prefer to excavate out a shallow amount of dirt under a flat surface to make room for a nest. Equipment can be designed to incorporate the desired void size(s) and/or configuration(s) attract one or more species of pest(s).

Termite Biology Factors

Termites have a variety of biological factors which can affect pest control equipment design. Some factors can be incorporated in order to make a station more attractive and therefore easier for termites to find. Other factors can affect, for example, how a termite monitoring material can best be inspected without disturbing the termites and having them vacate the monitoring station which might otherwise distort the monitoring process. These two categories, factors affecting the attractiveness of a termite control device, and termites' desire to remain in a control device are discussed below:

As described below, factors affecting the attractiveness of a termite control device include trackways, water, Food/Tunneling Materials/Inserts, Ground Shadows, and Ground Level Foraging.

Trackways: When subterranean termite species create foraging tunnels and encounter structures which present trackways, the termite tend to follow such structures. This behavior can be exploited in the design of termite control equipment by attaching rods or similar elongate members to the side or bottom of a termite station which preferably radiate out from the station in all directions. Such structure would tend to attract termites from a distance to the station.

Water: Water or high moisture can be sensed by termites from limited distances. Incorporating water chambers or cavities into the design of a termite station can add to the station's attractiveness. Water receptacles can be made to be refilled with each service or designed to naturally trap rain and/or sprinkler water. Stations can also be designed to attract water to the general area to increase ground moisture around the trap. Designs are also contemplated to render pest control stations more readily installable near downspouts where the soil moisture is higher but which also keep excess surface water out of the stations.

Food/Tunneling Materials/Inserts: Termites are attracted to insulative and nutritive materials as habitats. As such, termites generally prefer tunneling through soft wood and other substantially rigid, yet relatively soft materials. With this in mind, termite control equipment may be designed to effectively incorporate one of both of soft woods and other such termite attractant materials. Rigid foam materials such as styrofoam and the like are attractive to termites as insulative habitats and therefore are useful as termite attractants. However, they are not actual food sources and may be used in conjunction with natural wood products to produce a composite product which is especially attractive to termites. Moisture can be used as an added attractant by allowing a wood attractant to contact the soil thereby absorbing water from the ground. Additional blocks of wood or rigid foam can also be provided and prevented from touching the soil in order to limit the overall rate and extent of wood rot and render the moistened block more attractive with greater termite activity. The moisture content of foam materials may be enhanced by including preformed holes or receptacles into the foam that can be refilled or capture ground water whereby water would function as an added attractant to the foam, particularly in dry climates.

Ground Shadows: Subterranean termites are attracted to so-called "shadows" of large surface area objects on the ground surface. Such objects (such as a large rock on the ground) can be perceived as both a natural protector from rain water and a natural humidity chamber where moderate levels of ground water may condense. This can be exploited from a pest control system equipment design perspective by making a termite monitoring/control devices that are large and flat and adopted for placement on the ground surface. Ports may also be provided inside the station that can be filled from above with water and gradually release the water into the ground below the station to draw pests to the station.

Ground Level Foraging: Some species of subterranean termites may prefer to forage close to the ground level (i.e., at the top 0–6 inches of soil). This behavior can be exploited by equipment that has access ports relatively close to the ground level but not so close to allow surface water from running into the station. Additionally, a trackway such as a long tube or rod attached to the station may be inserted down into the ground to lead the termites into the bottom of a station.

Several factors affect termites' desire to remain in a control device. If subterranean termites are disturbed after they enter a monitoring station, they may leave the food/tunneling source and not return thereby compromising the accuracy of the monitoring test. Many factors can deter termites from continuing to feed and tunnel in a given monitor or bait/toxicant source. Many of these factors can be lessened by proper equipment design as discussed below.

One of the primary problems that can sufficiently disturb termites to cause them to leave a monitoring site is the removal of the feeding/tunneling source for routine inspections. With this in mind, equipment can be designed that makes the feeding/tunneling source easier to inspect while minimizing disturbance of the station. According to the invention, some methods to ease inspection include the following:

Multiple Blocks of Food/Tunneling Sources: Two or more blocks of wood and/or foam can be placed inside a station. If placed vertically into the ground, the blocks are separable from one another and placed upright end-to-end. In subterranean stations, the bottom block may be allowed to project through the station and contact the soil. This increases the wood moisture of the bottom block. The increased wood moisture of the bottom block will increase the amount of termite activity therein. Therefore, the top block can be removed for closer inspection without disturbing the primary termite activity in the bottom block. Such multiple block method also creates an ideal void between the blocks which termites will naturally tube over with mud tunnels in order to maintain constant moisture levels between the blocks. This void is easily inspected when removing the top block.

Similarly, an above-ground, horizontal station design may incorporate two or more blocks of food or tunneling material to provide laid side-by-side or one on top of the other such that at least one block contacts the soil. The space between the blocks as well as all exterior surfaces of each block may be easily inspected without significantly disturbing the other block.

Additionally, predrilling or preforming hole(s) into wood or foam, whether the monitors are disposed vertically or horizontally will increase the total outer surface area for termites to forage and tube over. And, when termites tunnel or tube inside the wood or foam, it is impossible to detect from a visual inspection of the exterior surfaces. The more surface area of the wood that can be exposed, therefore, the greater the number of exterior surfaces upon which termites can tube with mud tunnels for easy visual detection. Accordingly, holes preferably extending from the top to the bottom of any wood or foam material which can be tubed over are also desirable.

Slots, notches, grooves and the like may also be provided in the sides of vertical or horizontal food/tunneling materials to enhance tubing on the outside surfaces of such materials. Slots that are approximately ⅛ inch to ½ inch in width and depth, provide ideal termite tubing surfaces. Such slots are relatively easy for termites to tube up because the slot can be completely covered with less energy and mud. This accelerates the development of tubes on the outside of a surface and reduces and may eliminate the need to remove the material for inspections. Similar formations may also be included on any preformed or predrilled holes provided in the food/tunneling materials. Providing slots on the block periphery and/or on any preformed or predrilled holes may significantly increase the total surface area for tubing and inspectability.

Termites may also be "out-competed" for a particular food/shelter source by other pests such as ants and slugs. The present invention contemplates pest control equipment which avoids this situation by interfacing or incorporating above ground and/or below ground termite-specific components with general or specific insect baiting/toxicant housing components to prevent the non-termite pests from invading the termite components.

Rodent Biology Factors

Rodents such as mice, voles, rats, and moles all have behaviors that are predictable. These behavioral patterns can be exploited by incorporation of rodent-attractive features into pest control equipment design. Behaviors of mice that may be capitalized upon by use of the pest control system of the present invention include the following:

Edge-of-Wall Effect: Most rodents, like many other crawling pests discussed above, like to travel close to the base of a wall or other substantially vertical surface for protection and guidance. As an additional protective measure, they especially prefer narrow passageways next to walls. Accordingly, equipment can be designed that "funnels" rodents from the edge of a wall into a rodent control station. A passageway can also be designed into rodent control equipment which creates a dark runway for rodents to traverse before entering the actual trap area.

Hole Exploration: Many types of rodents have a curious nature with respect to unexplored holes. Holes represent potential nesting areas and food. Designing equipment with the proper size opening is important as is the provision of a dark hole that creates a mysterious appeal to lure the curious rodent inside.

Acquired Avoidance Response to Glueboards: Rodents can develop learned behavior toward glueboards and other tacky surfaces which enables them to identify and avoid such materials. They can also escape from tacky surfaces if not sufficiently trapped thereon. The best circumstances under which to trap rodents with glueboards is when they are in a hurry and do not carefully investigate their surroundings prior to undertaking a certain course of action. Rodent behavioral and/or physiological factors to be considered in the design of an effective rodent glueboard monitoring/ trapping station include the following:

Guard Hairs Touching Glue Surfaces: If a rodent approaches a glueboard while casually exploring an area, it will stop and investigate a glueboard surface. The rodent will reach its front foot over the glueboard. The lower guard hairs on the undersides of the rodent's foot will be pulled when they touch the glue surface. This will alert the rodent not to proceed onto the surface. If, however, a rodent can be forced to be committed to enter into an opening without the benefit of first feeling the top of the surface, trap catches on the glueboards can be increased. According to a presently preferred embodiment, therefore, the modular pest control system according to the invention, includes a "launch pad" on the outside of the entranceway of the glueboard component. The launch pad is specifically designed to be too high and too far away from the glue surface for the rodent to touch or test the glueboard surface with the guard hairs on undersides of its legs. That is, the rodent must decide to take the risk and jump down into the opening to further investigate which traps the rodent on the glueboard.

Self-Extraction from Glue Surfaces: Rodents can frequently pull themselves off of most glue surfaces, particularly when only one to three legs are trapped. Recognizing this, the present invention contemplates a rodent control device that reliably traps all four legs at once. For instance, equipment can be designed to make the surfaces around the glue surface too slick or smooth for a rodent to use for leverage for pulling itself off of the glue surface.

Response to Snap Traps: It is a common knowledge that snap traps work when rodents try to steal food from the trigger thereby setting off the dead fall arm. However, a rodent can also be trapped while trying to steal nesting materials (e.g., cotton, foam, or the like) or when they merely accidentally contact the trigger.

Rodents can escape the dead fall arm of a snap trap if the trigger is not sensitive enough or if the spring is too light and does not trap the rodent efficiently. Rodent control equipment can thus be designed to house snap traps and increase their success by building an effective trigger into the station design for better securing methods with the food or nesting materials.

Rodents can also be trapped in a snap trap if they are in a hurry and run into or onto a trap trigger. The present invention proposes rodent equipment designs that encourage rodents to jump through an opening and land on the trigger in a manner similar to the launch pad described above.

Hoarding Bait: Rodents are known to hoard food if they find a fresh source. This can be a problem with rodenticidal baits because the bait can be carried away by a rodent and dropped onto a surface such as a restaurant food preparation table and the like, thereby contaminating the surface. The present invention includes rodent control equipment designs that can prevent hoarding by either securing the bait inside an enclosed area or with a wire so that the rodent can only eat what is available at the station and cannot carry off larger pieces.

Flea Biology Factors

Fleas are attracted, particularly from their pupae form onward, by heat, carbon dioxide, light or any combination thereof. Equipment can therefore be designed to include any or all of these attractants for monitoring and/or low-level control of fleas. Because of their life cycle, Insect Growth Regulators or IGRs can be used to interrupt the cycle and prevent future offspring or inhibit development through one or more stages. These IGRs are volatile and can be dissipated with air flow over a compartment with a station. Adult fleas move by jumping, not crawling. Therefore, equipment designed to trap fleas that are attracted inside an enclosed space should have a large opening to allow easy access to the glue surface or bait/toxicant. If the top of the compartment with the glue needs to be covered, it can be covered partially with a tunneled lid that causes fleas to slide down the funnel and onto a tacky glue surface which may also include a bait and/or toxicant substance.

Ant Feeding Behaviors

Ants are interdependent social insects which have diverse dietary requirements. Many ant species typically require protein, sugars, other insects, plants, honeydew (from aphids) and oils on a regular yet variable basis. The foraging ants of a colony are instructed through chemical cues as to the type of food source the colony needs at any particular time. These needs may change daily, hourly or even more frequently depending on the species, time of year, availability of food sources, etc. Because of their seeming randomness, these changing dietary needs are currently impossible to predict with reliability by even the most sophisticated scientific techniques. However, to increase the likelihood of ant attraction, equipment can be designed to house as many different known ant food sources in as many physical consistencies as possible. In addition, equipment can be designed to attach to plants and trees to take advantage of the plants as additional food sources. Equipment may also be designed to attract and trap other insects and pests which can also provide an additional food source for ants in that they may feed on the dead pests.

Referring now to FIG. 1, there is shown an illustration of an embodiment of a replenishable pest control apparatus in accordance with the present invention comprising an attractant portion 12 (first portion) and a pest control portion 14 (second portion). As depicted in FIG. 1, the pest control portion 14 is configured to be inserted into and extracted from the attractant portion 12. However, it is envisioned that in an alternate embodiment, the pest control portion 14 is attached to the attractant portion 12. The pest control portion 14 also defines an opening 20 for hanging the apparatus to facilitate the control of flying pests. As described herein, a pest control portion 14 is any portion of the replenishable pest control apparatus that performs and/or facilitates the performance of controlling pests. An attractant portion 12 is any portion of the replenishable pest control apparatus that performs and/or facilitates the performance of attracting pests. The pest control portion 14 and the attractant portion 12 are not required to be configured as separate physical entities. Thus, the pest control portion 14 and the attractant portion 12 may be configured as separate components, they may be configured as the same component, or a combination thereof.

The attractant portion 12 includes an attractant (attractant not shown), which attracts pests via the openings 22. The attractant may be contained in a reservoir (reservoir not shown) or any appropriate means for containing an attractant, such that an odor, sound, light, gas, or a combination thereof is released/emitted through the openings 22 to attract pests. Replenishment of the attractant may be accomplished by providing additional attractant to the reservoir (containing means) via the openings 22, by separating the layers 12a, 12b, 12c, of the attractant portion 12 and providing additional attractant, or a combination thereof.

In another embodiment, the attractant portion 12 comprises layers 12a, 12b, and 12c, wherein layer 12b comprises the attractant thereon. In this embodiment, replenishment of the attractant may be accomplished by replacing the layer 12b with a pretreated layer 12b, wherein the pretreated layer 12b is pretreated with the appropriate attractant. Replenishment of the attractant may also be accomplished by providing additional attractant to the layer 12b by spraying, soaking, wiping, dipping, (or a combination thereof) the layer 12b with additional attractant. The layer 12b may be porous, absorbent, textured, or a combination thereof for adhering and/or retaining the attractant applied thereto.

The pest control portion 14 comprises a pest control agent 16. Also, the outer surfaces of the attractant portion 12 comprise the pest control agent 16. In one embodiment, replenishment of the pest control agent 16 may be accomplished by providing additional pest control agent 16 to the pest control portion 14 and/or outer surfaces of the attractant portion 12 by spraying, soaking, wiping, dipping, (or a combination thereof) additional pest control agent 16 thereto. The pest control portion 14 and/or the outer surfaces of the attractant portion 12 may be porous, absorbent, textured, or a combination thereof for adhering and/or retaining the pest control agent 16 applied thereto.

In another embodiment, replenishment of the pest control agent 16 and/or pest control portion 14 is accomplished by replacing the pest control portion 14 with a pretreated pest control portion 14, wherein the pretreated pest control portion 14 is pretreated with an appropriate pest control agent. In this embodiment, it is advantageous if the pest control portion 14 is configured to be inserted into and extracted from the attractant portion 12.

In an embodiment of the replenishable pest control apparatus as shown in FIG. 1 having pretreatable pest control portion 14 and pretreatable portion 12, as described above; the apparatus may be easily replenished by simply extracting the pest control portion 14 and extracting the layer 12b of the attractant portion 12 and inserting a pretreated pest control portion 14 and inserting a pretreated attractant portion layer 12b. Replenishment in this manner mitigates the need for a pest control technician to carry large amounts of pest control agent in heavy, awkward containers. In one embodiment, all outer surfaces, including all sides of the pest control portion 14 and including outer surfaces of the attractant portion 12, comprise the pest control agent 16.

Figure 2:
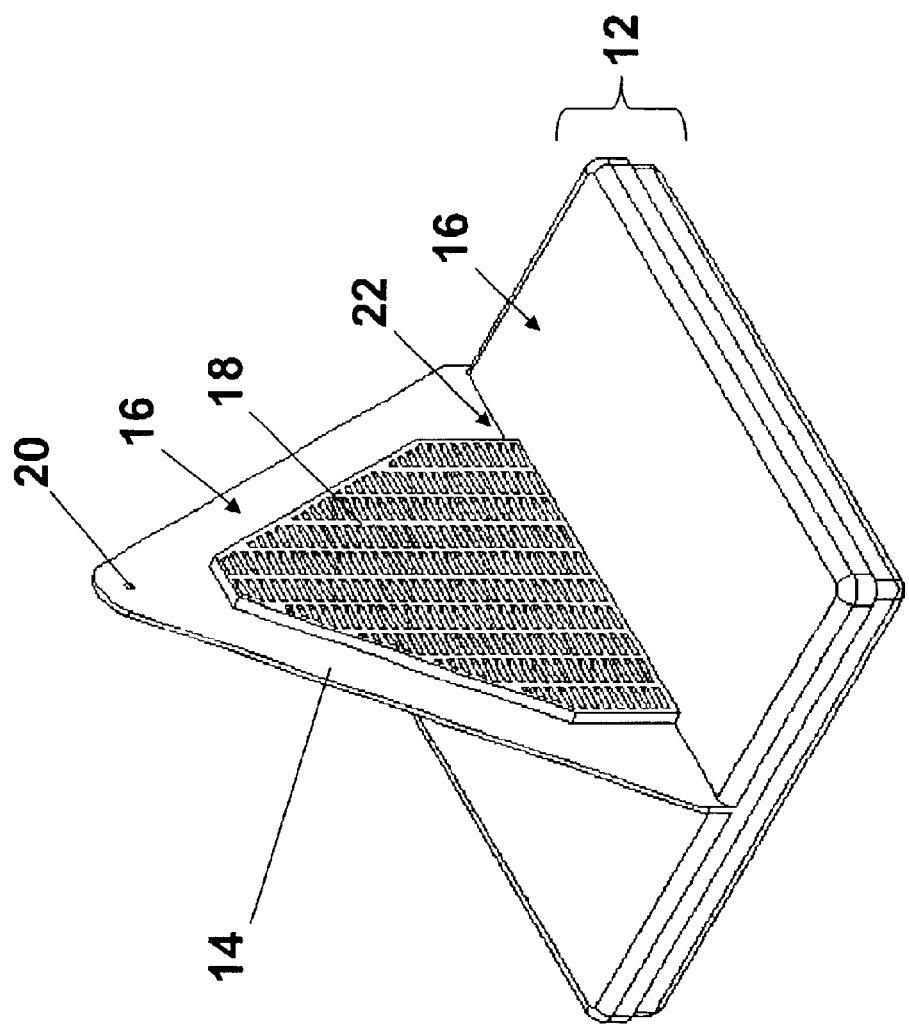
FIG. 2 is an isometric view of an embodiment of a replenishable pest control apparatus having a comprising a louvered portion for handling the pest control portion.

In FIG. 2 there is shown an illustration of a replenishable pest control apparatus in accordance with the present invention comprising a louvered portion 18 for handling the pest control portion 14. The louvered portion 18 may be coupled to the pest control portion 14 by any appropriate means, such as adhesive, for example. In one embodiment, the outer surface (surface facing away from the pest control portion 14) of the louvered portion 18 is not treated with pest control agent 16, although the inner surface (adjacent the pest control portion 14) and the inner surface of each opening formed by the louvered portion 18 may be treated with the pest control agent 16. In this embodiment, utilizing the louvered portion 18, a pest control technician may insert and remove the pest control portion 14 without touching/handling same.

In another embodiment, although not shown in FIG. 2, the attractant portion 12 defines the openings 22. In this embodiment, the openings 22 are protected by the louvered portion 18. Protection of the openings 22 by the louvered portion 18 is advantageous when the replenishable pest control apparatus is deployed outside. In this situation, the louvered portion 18 protects the openings 22 from weather, such a rain, snow, sunlight, and wind swept debris, for example. Furthermore, the openings defined by the louvered portion 18 allow the attractant to be released/emitted for attracting pests.

Figure 3:
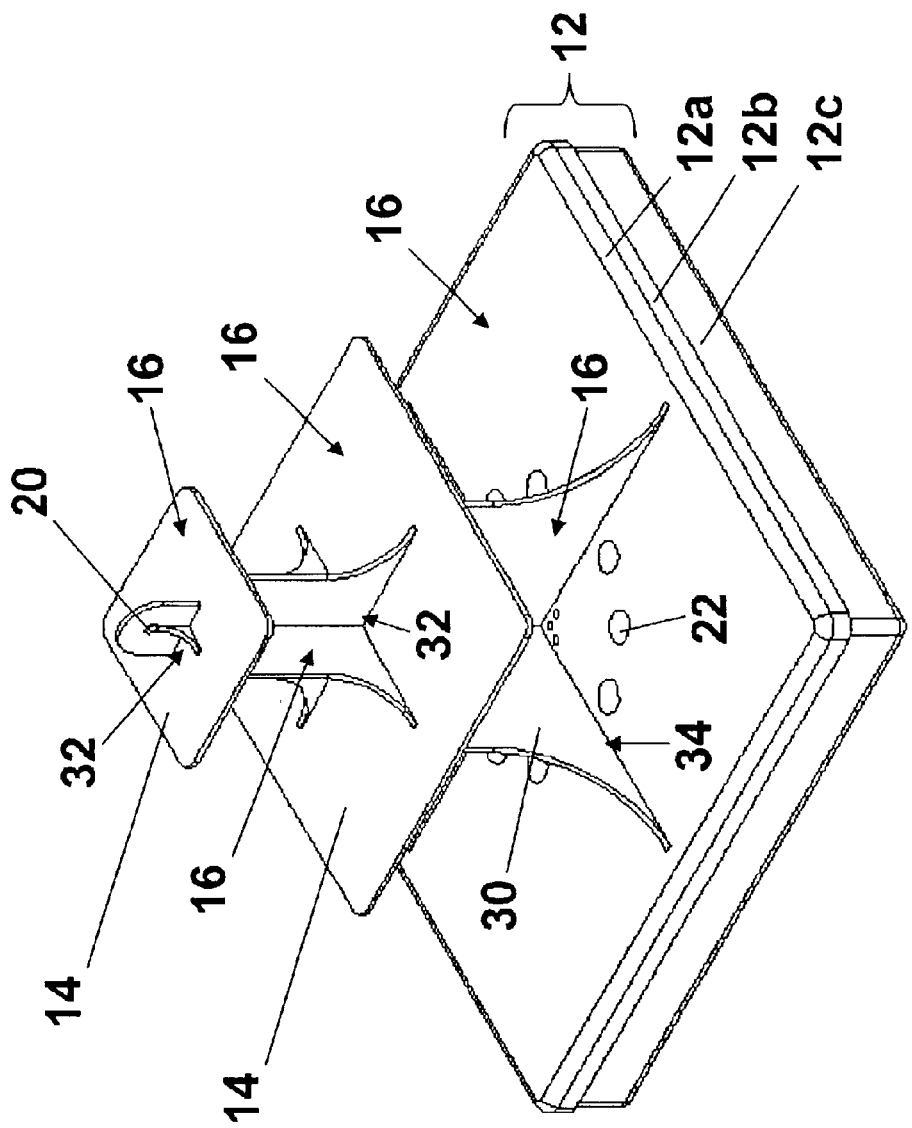
FIG. 3 is an isometric view of an embodiment of a replenishable pest control apparatus in accordance with the present invention having a plurality of pest control portions, a center member, an opening defined by the center member, and the attractant portion.

FIG. 3 is an illustration of an embodiment of a replenishable pest control apparatus in accordance with the present invention having a plurality of pest control portions 14, a center member 30, an opening 20 defined by the center member 30, and the attractant portion 12. The opening 20 and the attractant portion 12 function similarly as described above with respect to FIGS. 1 and 2. The plurality of pest control portions 14 are vertically positioned (stacked) with respect to each other on the center member 30. The center member 30 is wider at its base (bottom) than at its top for facilitating separation of the pest control portions 14. Each pest control portion 14 defines an opening 32 proximate its center. The plurality of pest control portions 14, their respective openings 32, and the center member 30 are conformably configured such that the center member 30 is inserted into each pest control portion 14, wherein the size of each respective opening 34 determines the location of the corresponding pest control portion 14 on the center member 30. The attractant portion 12 defines an opening 30 for insertion of the center member 30 therein. As described above, each pest control portion 14 and/or pest control agent 16 may be replenished by replacement with pretreated portions, by applying additional pest control agent 16, or a combination thereof. Similarly, center member 30 may by replenished by replacement with a pretreated center member 30, reapplication of the pest control agent 16, or a combination thereof In one embodiment, all outer surfaces, including upper and lower sides of each pest control portion 14 and including outer surfaces of the attractant portion 12, comprise the pest control agent 16.

Figure 4B:
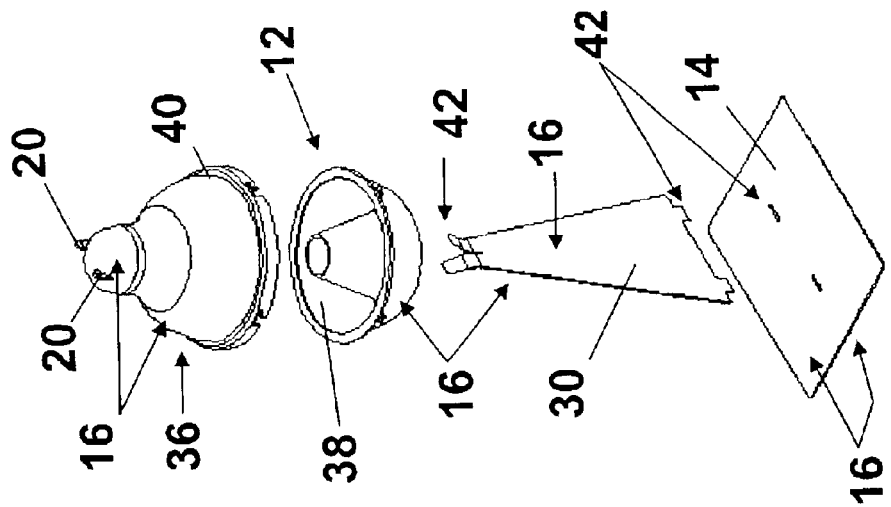
FIG. 4B is an exploded view of the apparatus shown in FIG. 4A.
Figure 4A:
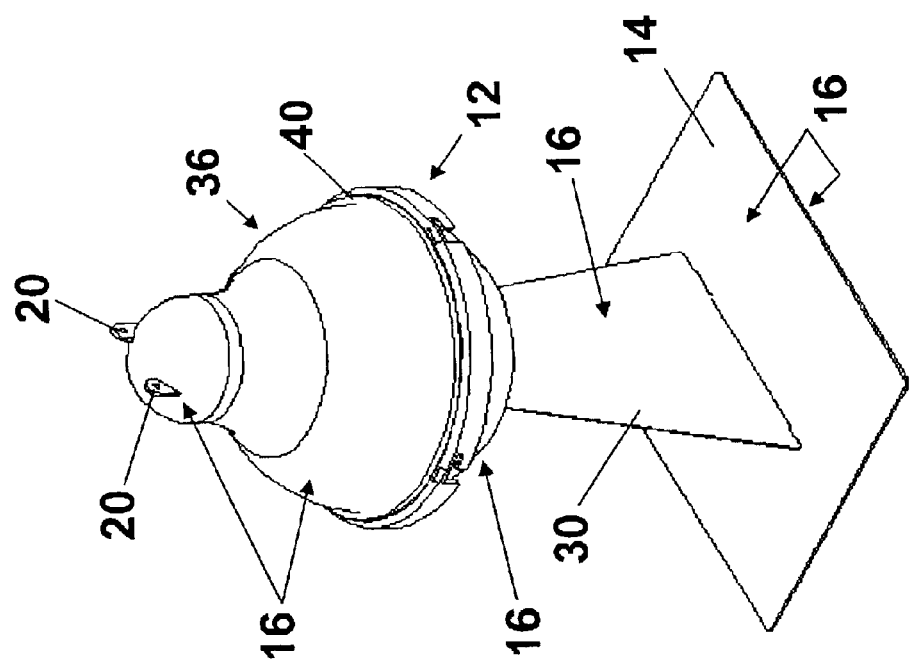
FIG. 4A is an isometric view of an embodiment of the replenishable pest control apparatus in accordance with the present invention comprising a cover positioned over the attractant portion.

FIGS. 4A and 4B are an isometric view and an exploded view, respectively, of an embodiment of the replenishable pest control apparatus in accordance with the present invention comprising a cover 36 positioned over the attractant portion 12. The embodiment depicted in FIG. 2 is advantageous for controlling flying pests such as house flies, yellow jackets, for example. The cover 36 comprises a rounded outer surface (e.g., pair shaped), which provides a landing surface for flying pests and protects the attractant portion 12 from elements such as rain, snow, sunlight, and wind blown debris, for example. The cover 36 also comprises a perimeter landing ledge 40 for providing a landing surface for flying pests. The embodiment shown in FIGS. 4A and 4B also comprise openings 20 defined by the cover 36, center member 30, and pest control portion 14, which functionally similarly to the description provided above. The center member 30 is coupled to the attractant portion 12 and the rest control portion 14 by any appropriate means, such as by tab and slot means 42, adhesively couple, or a combination thereof, for example.

The attractant portion 12 defines a reservoir 38 for containing an attractant. Replenishment of the attractant may be accomplished by filling the reservoir 38 with a liquid attractant, by replacing the existing attractant with a pretreated attractant (e.g., pretreated sponge), or a combination thereof. Replenishment may also be accomplished by replacing the attractant portion 12, with a pretreated attractant portion 12 having a pretreated attractant therein. In one embodiment, all outer surfaces are treated with an appropriate pest control agent 16. As described above, surfaces may be porous, absorbent, textured, or a combination thereof for facilitating absorbtion and/or adhesion of the pest control agent 16.

Figure 5:
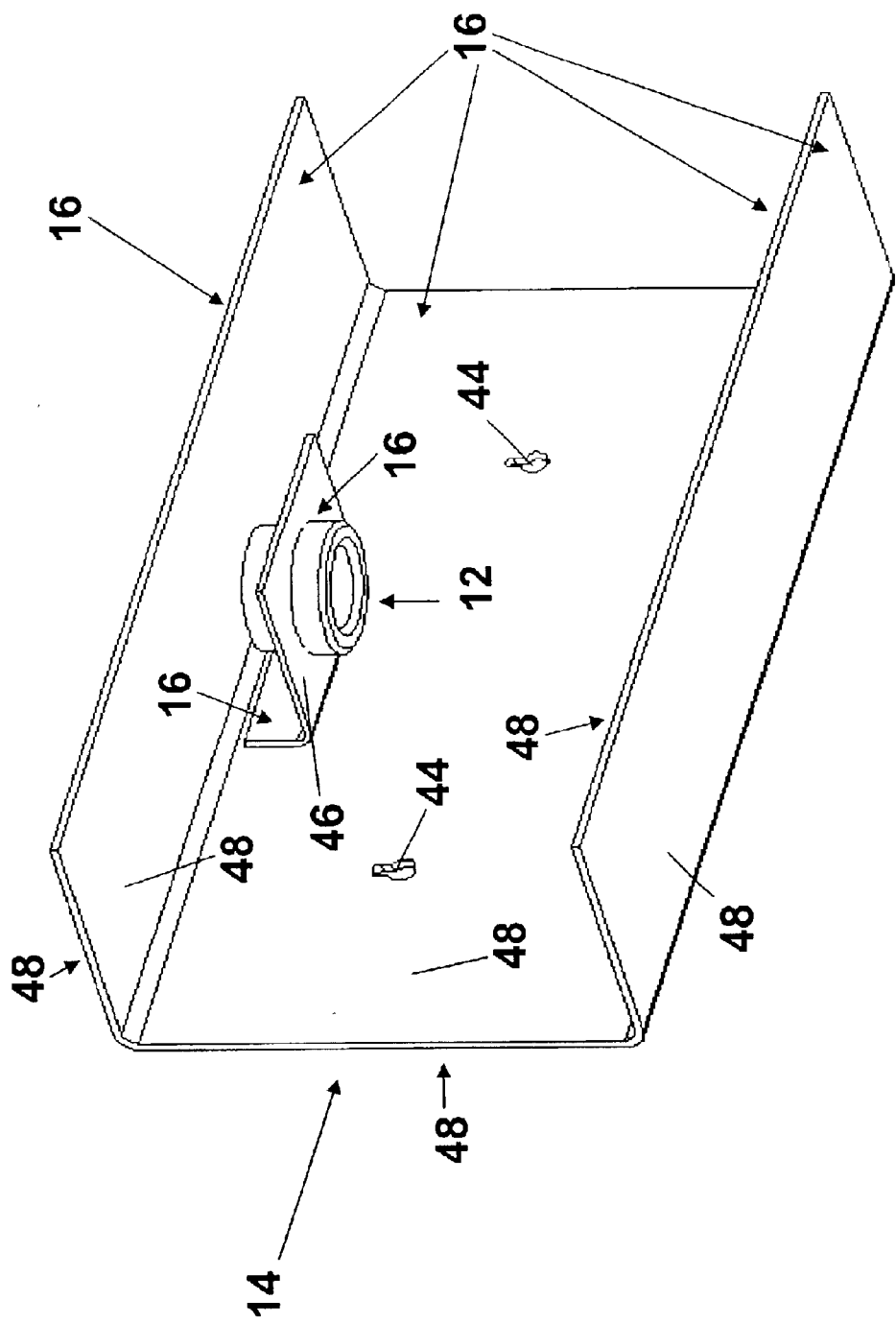
FIG. 5 is an isometric view of a wall mountable replenishable pest control apparatus in accordance with the present invention.

In FIG. 5 there is shown an illustration of a wall mountable replenishable pest control apparatus in accordance with the present invention. The embodiment shown in FIG. 5 comprises pest control portion 14 comprising a plurality of landing surfaces 48, and an attractant portion 12 attached to the pest control portion 14 by attachment member 46. The pest control portion 14 defines openings 44 configured to facilitate mounting the apparatus of FIG. 5, on an object, such as a wall, for example.

The pest control portion 14 comprises vertical and horizontal landing surfaces 48 for controlling flying pests such as house flies and yellow jackets, for example. Also, depending upon mounting placement of the replenishable pest control apparatus (e.g., proximate a corner or a junction of wall, ceiling or floor surfaces), crawling pest may be controlled. If the replenishable pest control apparatus is mounted against a wall such that a gap is formed between that wall and the adjacent surface 48 of the pest control portion 14, that adjacent surface may be utilized to control pests by provided a surface having pest control agent 16 thereon, which can be transferred to a pest as it maneuvers within the gap between the wall and the adjacent surface 48.

The attractant portion 12 includes a portion, such as a reservoir, for containing an attractant, such as a odor producing attractant, or a pheromone, for example. Replenishment of the attractant and/or the attractant portion 12 may be as accomplished as described above. For example, the reservoir may be replaced with a filled reservoir, the reservoir may be refilled, the attractant portion 12 may be replaced with a pretreated attractant portion 12, or a combination thereof. The attractant portion 12 may be attached to the pest control portion 14 by any appropriate coupling means such as adhesive, pile and hook (e.g., VELCRO®), threaded fasteners, or a combination thereof. In one embodiment, all surfaces 48 are treated with an appropriate pest control agent 16, such as a residual pest control agent, for example. Also, surfaces of the attachment member 46 are treated with a pest control agent 16. As describe above, surfaces may be porous, absorbent, textured, or a combination for facilitating absorption and/or adhesion of the pest control agent 16 and/or the attractant.

Figure 6A:
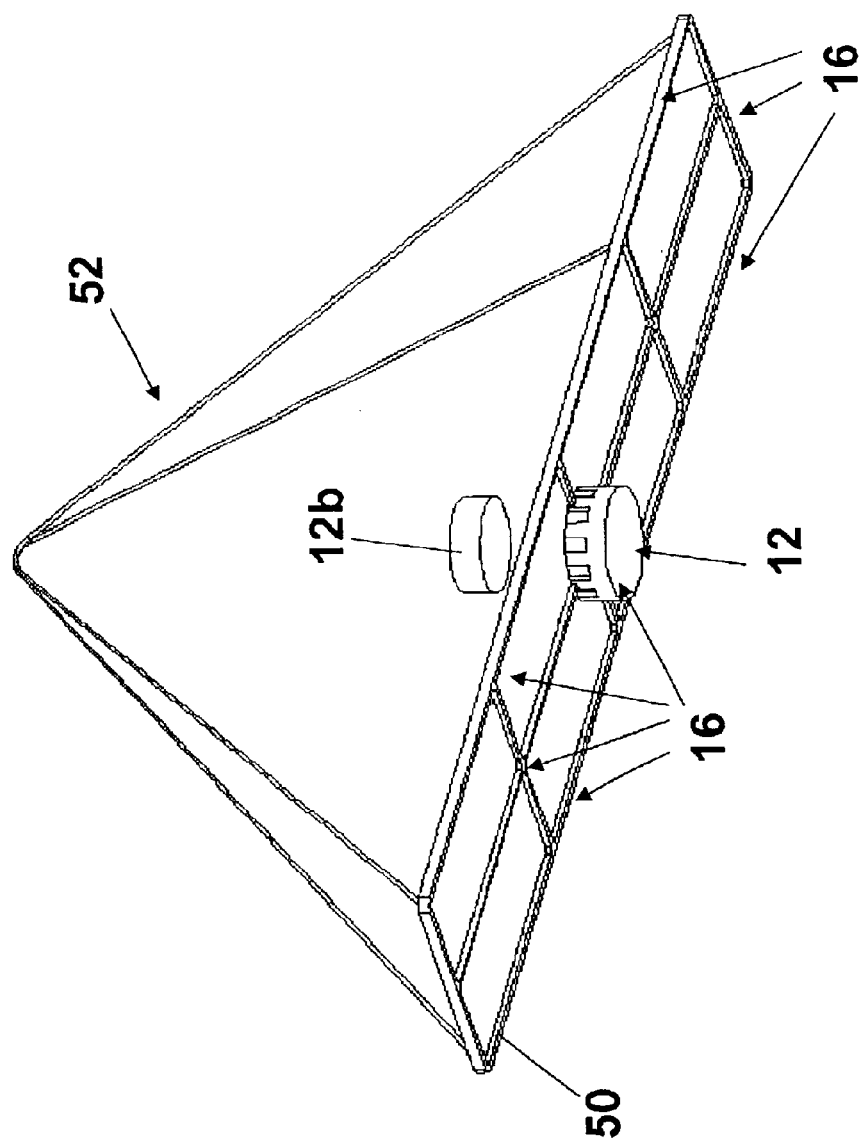
FIG. 6A is an isometric view of an embodiment of a hangable replenishable pest control apparatus in accordance with the present invention comprising a framed support structure.
Figure 6B:
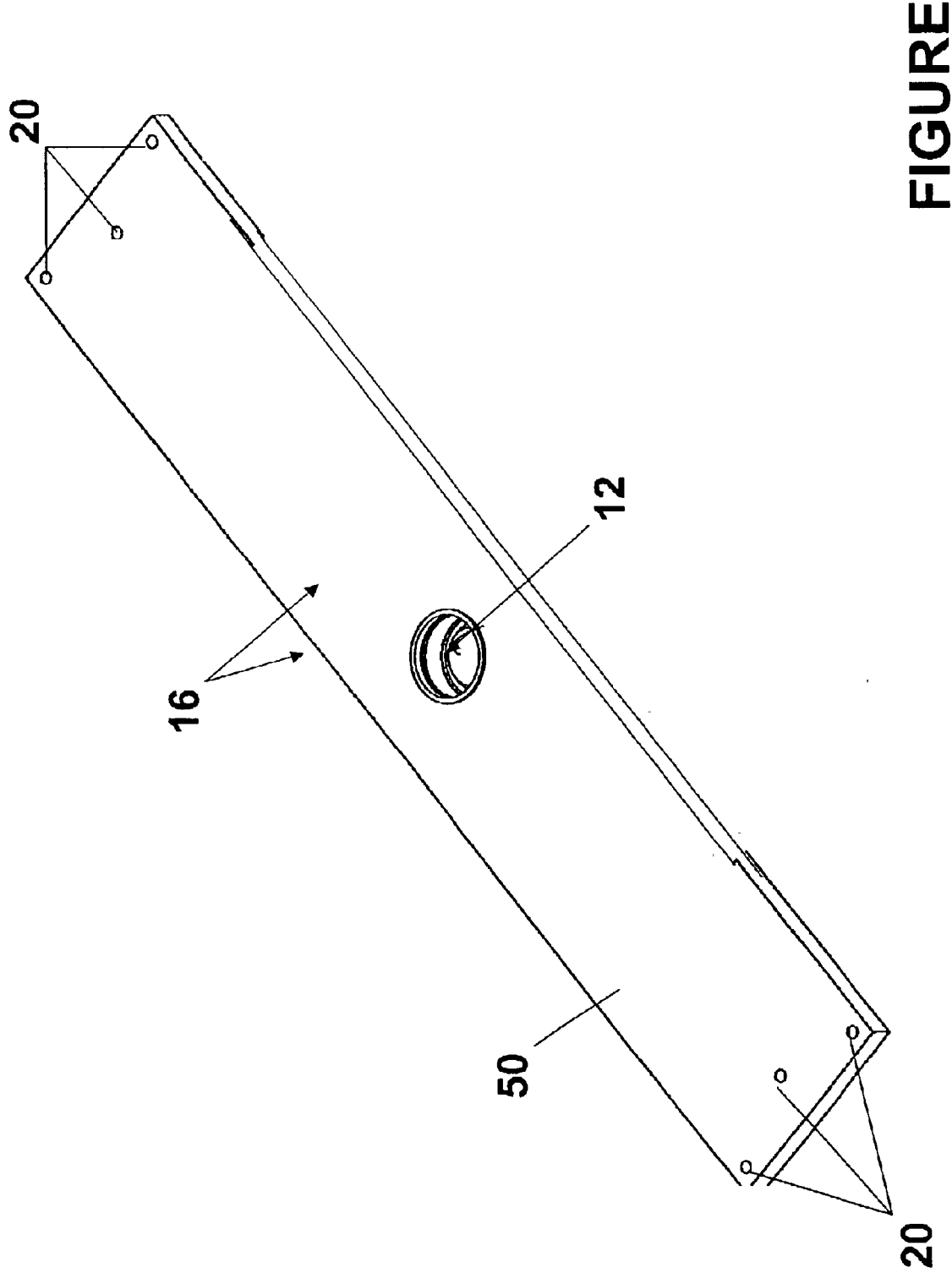
FIG. 6B is an isometric view of an embodiment of a hangable replenishable pest control apparatus in accordance with the present invention comprising a solid support structure.
Figure 6C:
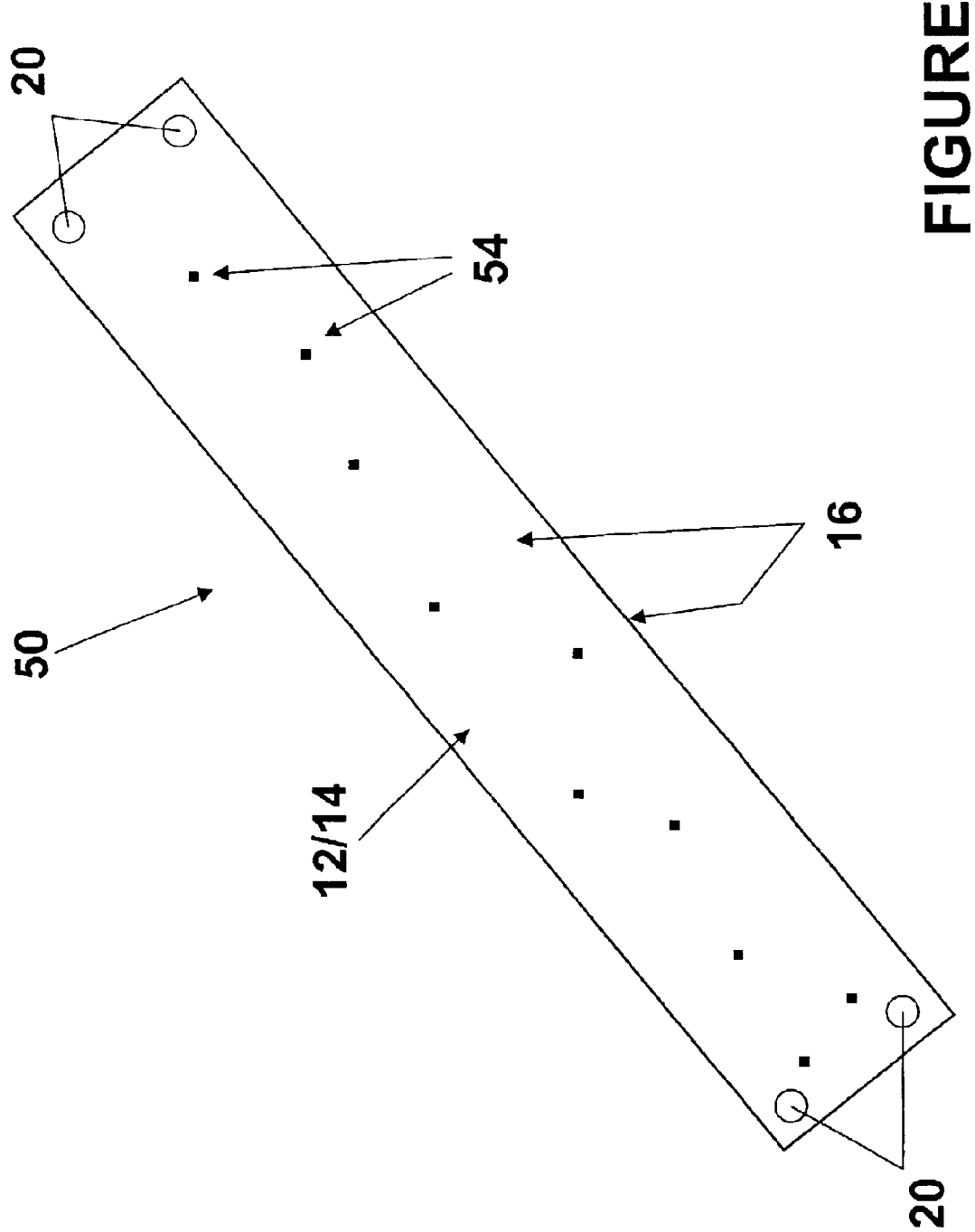
FIG. 6C is a planar view of an embodiment of a hangable replenishable pest control apparatus in accordance with the present invention comprising a single component (support structure) configured to function as both the attractant portion and the pest control portion.

FIGS. 6A, 6B, and 6C are illustrations of an embodiment of a hangable replenishable pest control apparatus in accordance with the present invention comprising a framed support structure 50, a solid support structure 50, and a solid support structure 50 configured to be an attractant and a pest control agent, respectively. The embodiments shown in FIGS. 6A and 6B also comprise the support structure 50 having a pest control agent 16 thereon, an attractant portion 12, and hanging means 52 (shown only in FIG. 6A). These embodiments are advantageous for controlling flying pests, such as flying insects, for example. Flying insects are visually attracted to the suspended hanging edges of the support structures 50. Pests are also attracted by the attractant portion 12. The attractant portion 12 may comprise a reservoir for containing an attractant. Replenishment of the attractant may be accomplished by filling the reservoir with a liquid attractant, by replacing the existing attractant with a pretreated attractant (e.g., pretreated sponge or solid attractant 12b), or a combination thereof. Replenishment may also be accomplished by replacing the attractant portion 12, with a pretreated attractant portion 12 having a pretreated attractant therein. In one embodiment, surfaces of the support structure 50 and the attractant portion 12 are treated with an appropriate pest control agent 16, such as a residual pest control agent, an immobilizing adhesive, or a combination thereof, for example. As described above, surfaces may be porous, absorbent, textured, or a combination thereof for facilitating absorption and/or adhesion of the pest control agent 16.

FIG. 6C shows a single component (support structure 50) being both the attractant portion 12 and the pest control portion 14. The support structure 50 visually attracts flying insects, such as flies for example, due, at least in part, to its color. In one embodiment, the support structure 50 is white for visually attracting flies. The support structure 50 may be other relative light colors for attracting pests. To further aid in attracting flies, dark markings 54, may be included on the surfaces of the support structure 50. The markings 54 function as decoys for visually attracting flies. The markings 54 may be any appropriate markings, such as three-dimensional markings, colored markings, realistic representations of specific pests, or a combination thereof. Thus, the support structure 50 functions as the attractant portion 12 by visually attracting pest via color and markings 54. The support structure 50 also functions as the pest control portion 14 by being treated with pest control agent 16, such as an pesticide, an immobilizing adhesive, or a combination thereof, for example. In one embodiment, pest control agent 16 is a residual pest control agent that is applied to the support structure 50 as desired.

Figure 7:
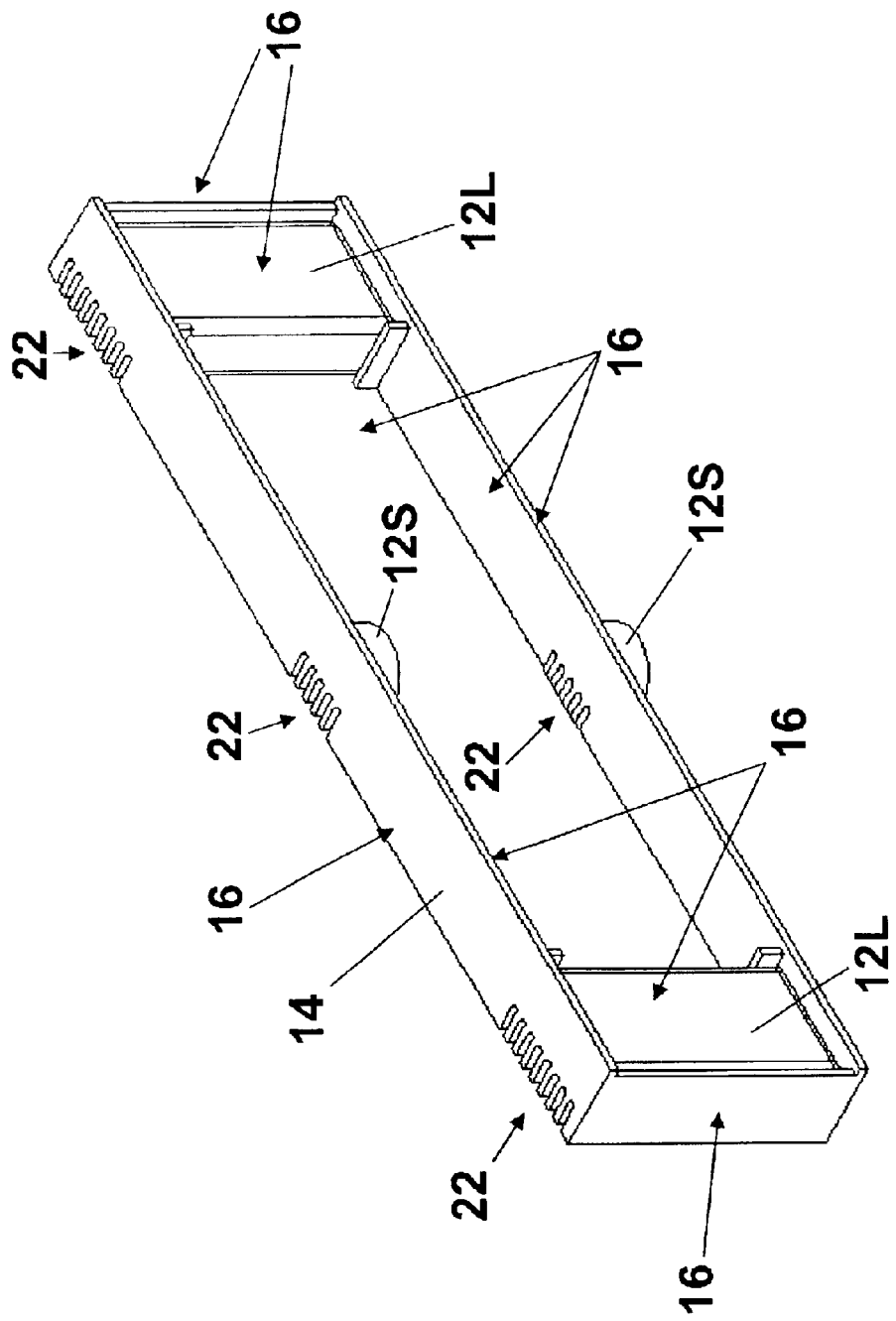
FIG. 7 is an isometric view of an embodiment of the replenishable pest control apparatus in accordance with the present invention configured to comprise a liquid and a solid attractant.
Figure 8:
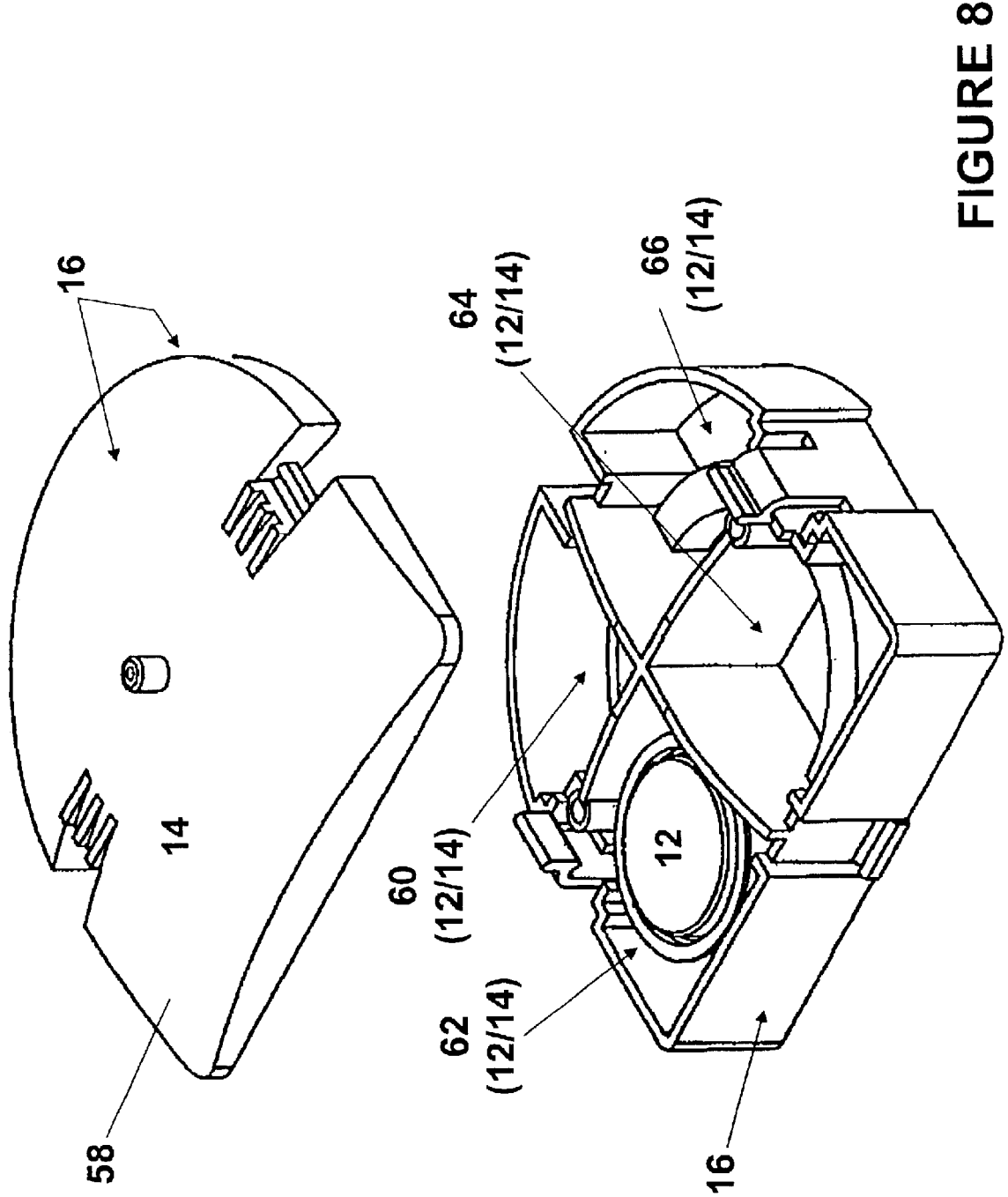
FIG. 8 is an isometric view of a ground mountable replenishable pest control apparatus in accordance with the present invention comprising a plurality of compartments, each of which can be configured to function as pest control portions, attractant portions, or a combination thereof.

FIG. 7 is an illustration of an embodiment of the replenishable pest control apparatus in accordance with the present invention configured to comprise a liquid and a solid attractant. The embodiment shown in FIG. 7 comprises four separate attractant portions. The two attractant portions positioned on the ends of the replenishable pest control apparatus 12L are configured to contain a liquid attractant, and the two attractant portions positioned toward the center of the replenishable pest control apparatus 12S are configured to contain a solid attractant. As described above, replenishment of the attractants may be accomplished by filling the attractant portions 12L with additional liquid attractant, by replacing the attractant portions 12L with pretreated attractant portions 12L (e.g., pre-filled with liquid attractant), or a combination thereof Also as described above, the attractant portions 12S may be replenished by replacing the solid attractant with another solid attractant, by replacing the attractant portions 12S with pretreated attractant portions 12S (e.g., pre-filled with solid, sponge), or a combination thereof In FIG. 8 there is shown an illustration of a ground mountable replenishable pest control apparatus in accordance with the present invention comprising a plurality of compartments 60, 62, 64, 66, each of which can be configured to function as pest control portions 14, attractant portions 12, or a combination thereof. The cover 58 functions as a pest control portion 14. Pest control agent 16 is applied to the cover 58. Each of the compartments, 60, 62, 64, 66, may be configured to contain an attractant, a pest control agent, or a combination thereof. Each compartment 60, 62, 64, 66, may contain an attractant, a pest control agent, bait, or a combination thereof, designed to control specific pests. For example, the cover 58 may be treated with a residual pesticide for attracting (provides landing surface) and controlling flying insects, the compartment 62 may comprise a nontoxic food source (thus functioning as an attractant portion 12) for attracting crawling insects, and the compartments 60, 64, 66, may comprised various types of toxic baits, for attracting/controlling specific crawling insect types. Each of the attractant(s) and/or pest control agent(s) is replenishable by any of the means described above.

Figure 9:
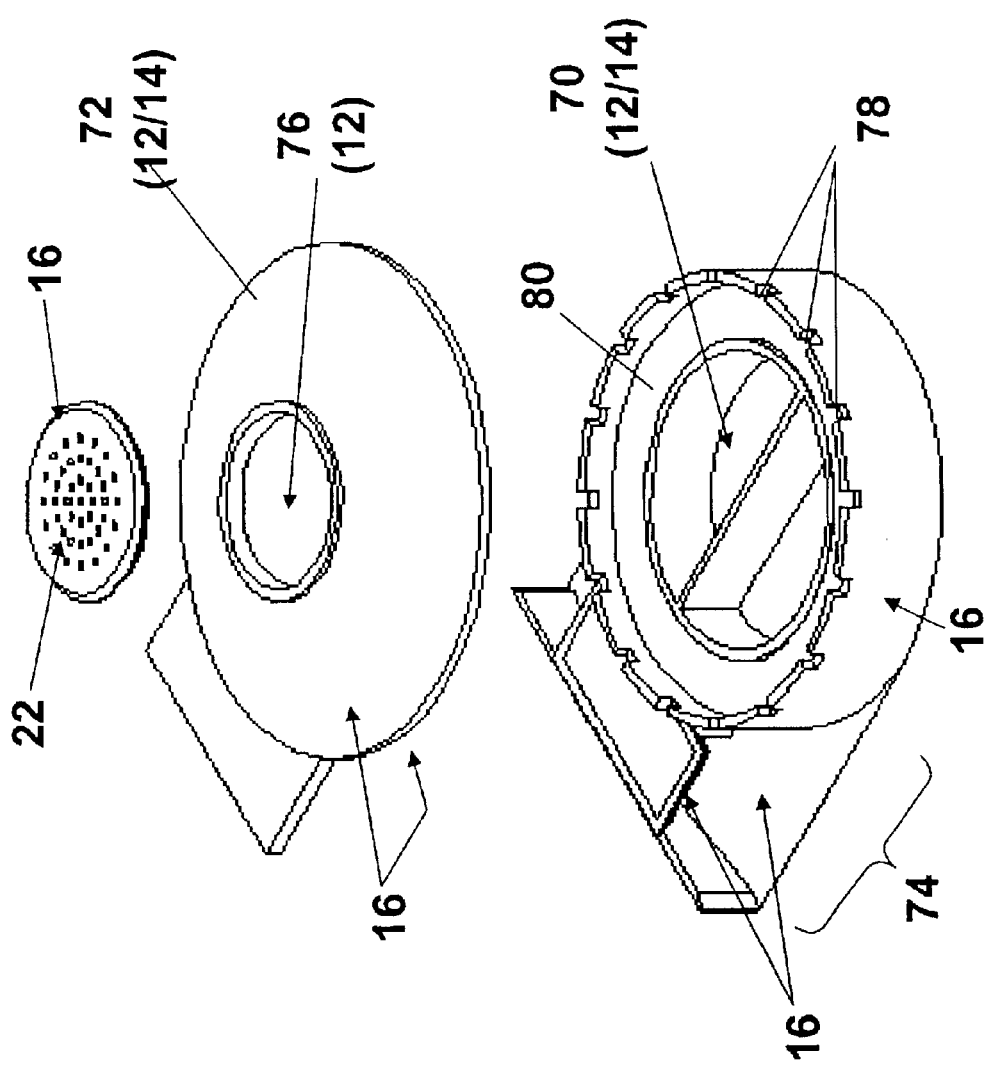
FIG. 9 is an isometric view of a wall or ground mountable multiple purpose replenishable pest control apparatus in accordance with the present invention comprising a plurality of compartments for attracting and/or controlling flying and crawling pests.

FIG. 9 is an illustration of a wall or ground mountable multiple purpose replenishable pest control apparatus in accordance with the present invention comprising a plurality of compartments 70, 76 for attracting and/or controlling flying and crawling pests. Flying insects are attracted to the cover 72 as a landing surface, thus functioning as an attractant portion 14. The cover 72 also functions as a pest control portion 12 by application of a pest control agent 16, such as a residual pesticide for example, to the surface of the cover 72. In one embodiment, the pest control agent 16 is also applied to the surface area of the component defining openings 22. Openings 22 provide a means for the attractant contained in the attractant portion 76 to be released/emitted. A runway 74 is located on the outside edge of the replenishable pest control apparatus. Crawling pests go into the runway area 74 as they crawl along the edge of a wall, for example. As crawling pests enter the runway 74, they make contact with a residual pesticide 16 applied inside the runway 74. Another function is provided by a separate compartment 70 that allows access to only small pest such as ants, for example, via openings 78. The compartment 70 may comprise an attractant, a pest control agent, or a combination thereof. Ring-shaped surface 80 may be treated with a residual pest control agent. When pests, such as ants, enter the apparatus via the openings 78, they contact the residual pest control agent applied to the surface 80. The ring-shaped surface 80/residual pest control agent may be replenished by any appropriate means, as described above, such as by retreating the ring-shaped surface 80, by replacing the ring-shaped surface 80 with a pretreated ring-shaped surface 80, or a combination thereof, for example. As also described above, components may be treated by spraying, wiping, dipping, or a combination thereof.

Figure 10:
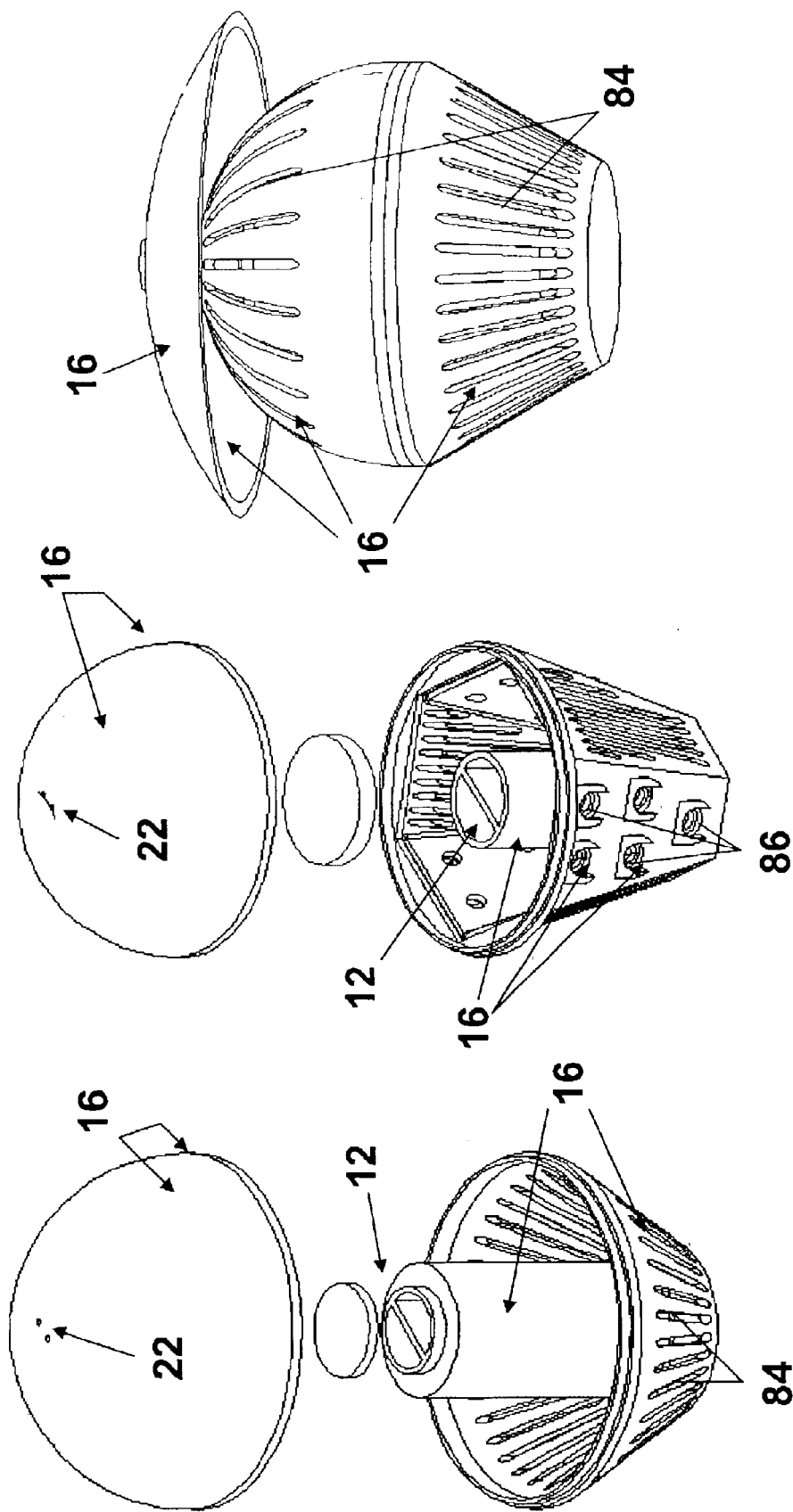
FIG. 10A is an isometric view of an embodiment of a hangable replenishable pest control apparatus in accordance with the present invention for attracting/controlling flying pests.
FIG. 10B is an isometric view of another embodiment of a hangable replenishable pest control apparatus in accordance with the present invention for attracting/controlling flying pests.
FIG. 10C is an isometric view of yet another embodiment of a hangable replenishable pest control apparatus in accordance with the present invention for attracting/controlling flying pests.

FIGS. 10A, 10B, and 10C are illustrations of various embodiments of hangable replenishable pest control apparatus in accordance with the present invention for attracting/controlling flying pests. Flying pests, such as wasps and bees, for example, are attracted to the attractant contained in the attractant portions 12. Attractant portions 12 are configured to comprise a plurality of compartments, which may each contain a respective attractant for attracting a respective, specific pest. Openings 22, 84, and 86, provide means for the attractant to be released/emitted. The surface of the covers is treated with a pest control agent 16. The surface of the covers provides a landing surface for flying pests. Also, openings 84 and 86 provide flying pests access to the inner portions of the respective apparatus. Openings 84 and 86 are treated with a pest control agent 16. As flying pests enter the apparatus via opening 84 and/or 86, they contact the pest control agent 16.

Figure 11:
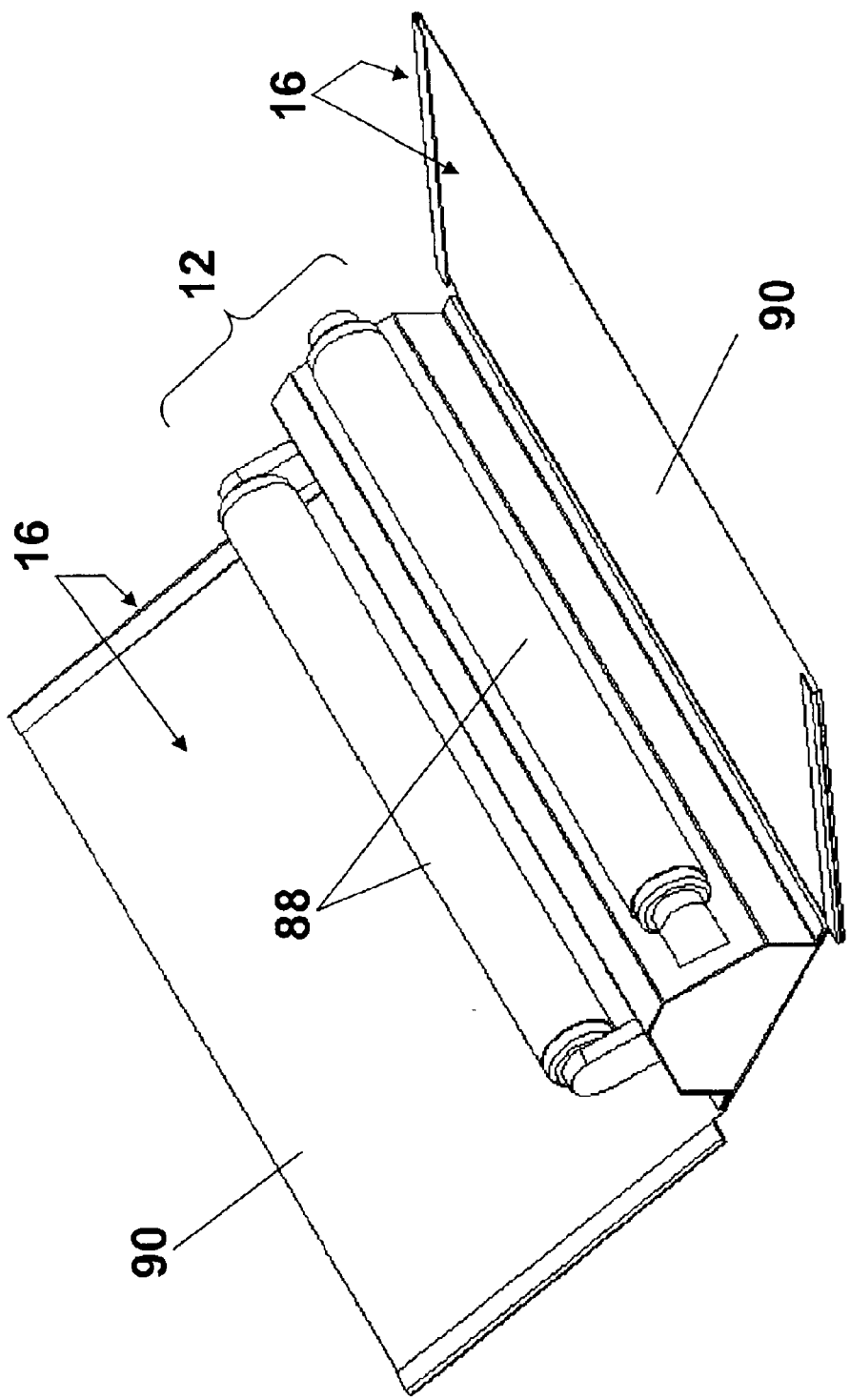
FIG. 11 is an isometric view of an embodiment of the replenishable pest control apparatus in accordance with the present invention comprising a light source as an attractant.

FIG. 11 is an illustration of a replenishable pest control apparatus in accordance with the present invention comprising a light source 88 as an attractant 14. The light source 88 may be any appropriate light source for attracting pests, such as an ultraviolet light for attracting flying insects, for example. As the pests are attracted to the light source 88, they land on the landing surfaces 90, which are treated with a pest control agent 16.

Although a replenishable pest control apparatus in accordance with the present invention has been described in conjunction with one or more embodiments, it will be apparent to those skilled in the art that other alternatives, variations and modifications will be apparent in light of the foregoing description as being within the spirit and scope of the invention. Thus, a replenishable pest control apparatus in accordance with the present invention is intended to embrace all such alternatives, variations and modifications as may fall within the spirit and scope of the following claims. For example, the pest control portion and the attractant portion may be configured as a single component, or a plurality of components. The attractant and the pest control agent may be configured as separate entities or may be combined (e.g., a mixture). The replenishable pest control apparatus in accordance with the present invention may comprise a replenishable attractant portion, a replenishable pest control portion, or a combination thereof. Thus, it is envisioned that various embodiments may comprise only one replenishable portion, wherein the other portion is not replenishable (e.g., attractant is color of surface and thus not routinely replenished).

What is claimed is:

1. A pest control apparatus comprising:

an attractant disposed in a first portion of the pest control apparatus; and a pre-treated surface disposed in a second portion of the pest control apparatus different from said first portion, said surface being pre-treated with a liquid pesticide, wherein:
   at least one of said attractant and said pre-treated surface are replaceable, and wherein said attractant comprises a phermone.

2. An apparatus in accordance with claim 1, wherein:

said attractant is replenished by providing additional attractant; and said liquid pesticide is replenished by providing additional liquid pesticide to said pre-treated surface of the pest control apparatus.

3. An apparatus in accordance with claim 1, wherein:

at least one surface of said apparatus is textured to facilitate application of an additional liquid pesticide to said at least one surface.

4. An apparatus in accordance with claim 1, wherein:

at least one surface of said apparatus is at least one of porous and absorbent to facilitate retention of said liquid pesticide to said at least one surface.

5. An apparatus in accordance with claim 1, wherein said apparatus is configured to control at least one pest selected from the group consisting of flying pests and crawling pests.

6. An apparatus in accordance with claim 1, wherein said apparatus is configured to control at least one pest selected from the group consisting of ants and flying insects.

7. An apparatus in accordance with claim 1, further comprising:

at least one opening for providing a pest access to said attractant, wherein:
   each such opening is treated with said liquid pesticide.

* * * * *